May 9, 1961    W. J. ROSSELOT    2,983,060
MATERIAL MOVING DEVICE
Filed May 8, 1957    3 Sheets-Sheet 1
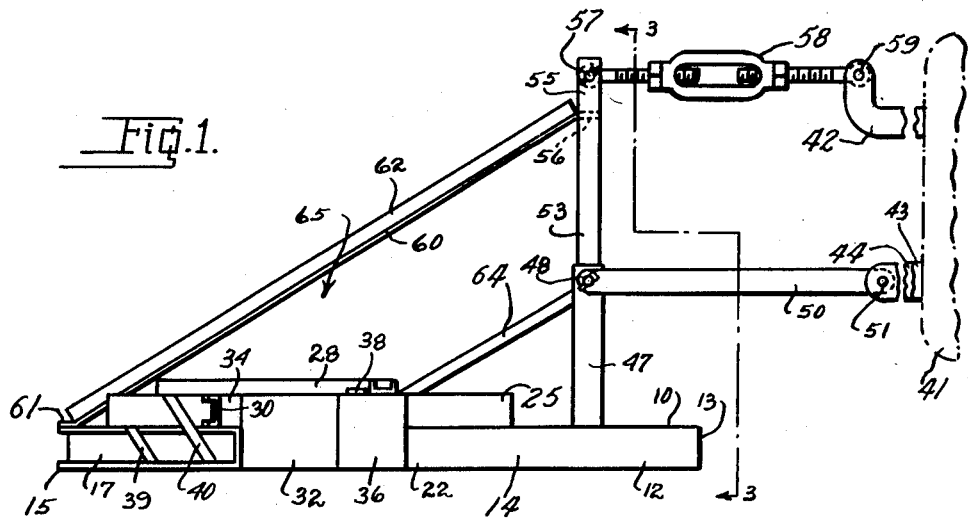
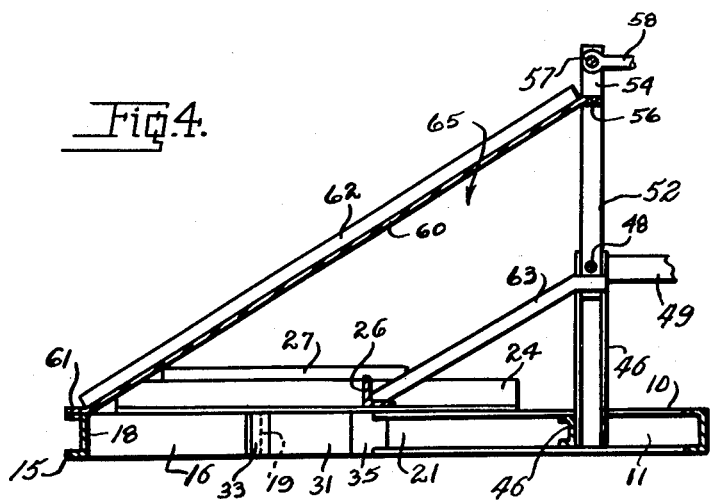
INVENTOR.
WALTER J. ROSSELOT
BY
*Joseph A. Rave*
Attorney

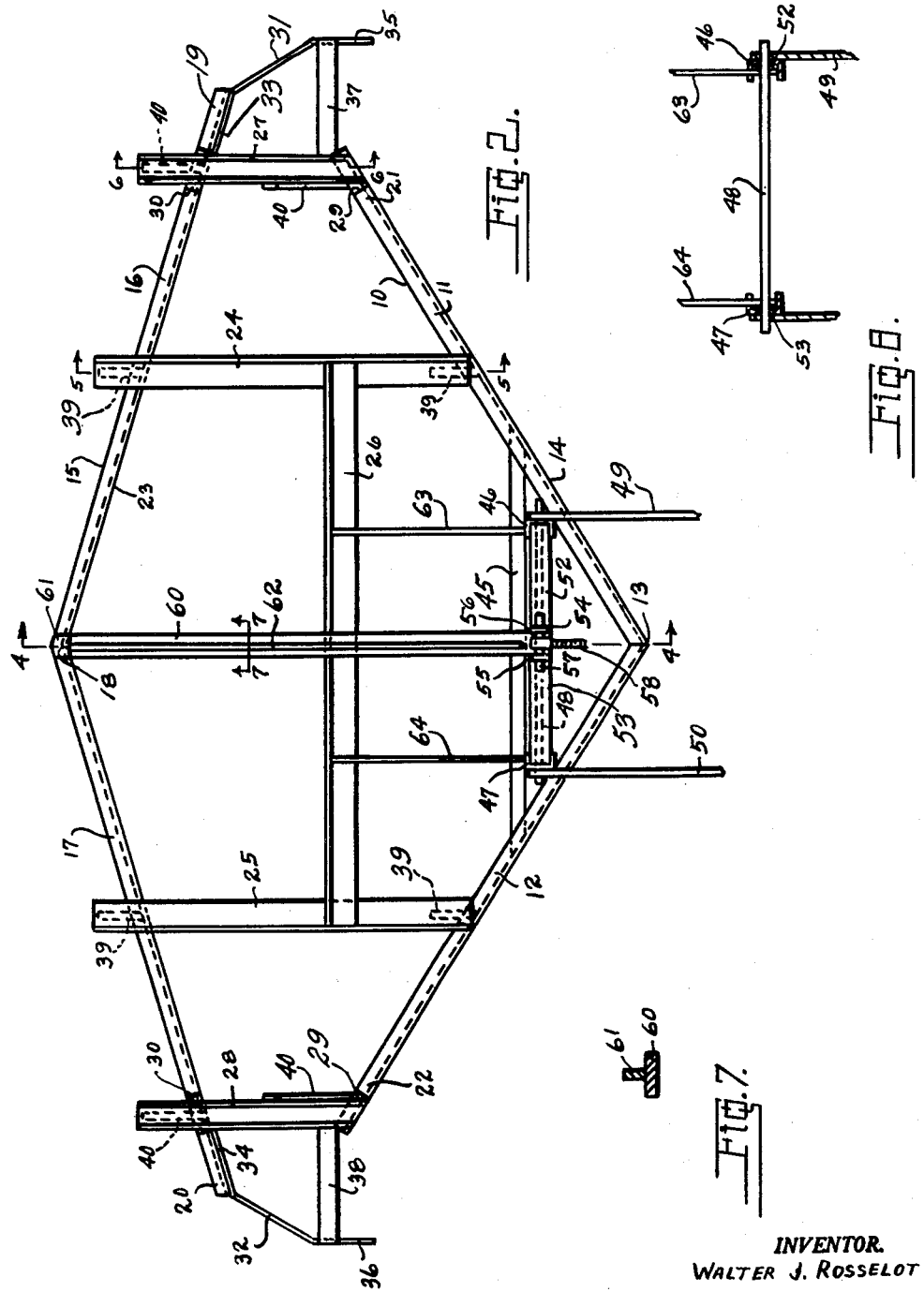

May 9, 1961 W. J. ROSSELOT 2,983,060
MATERIAL MOVING DEVICE
Filed May 8, 1957 3 Sheets-Sheet 3
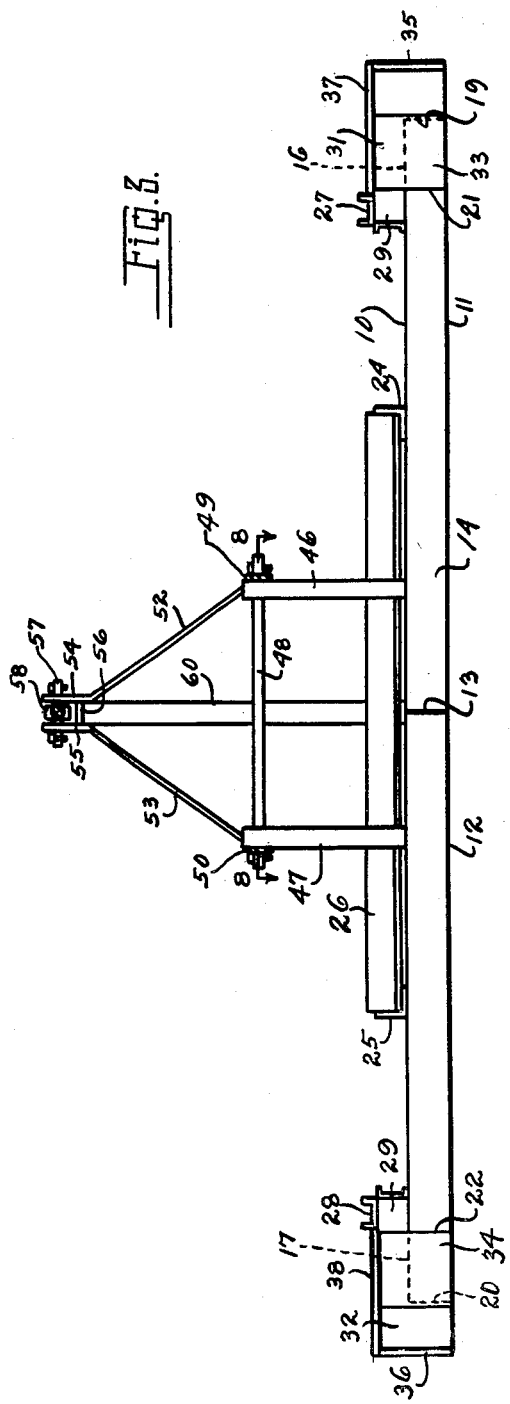
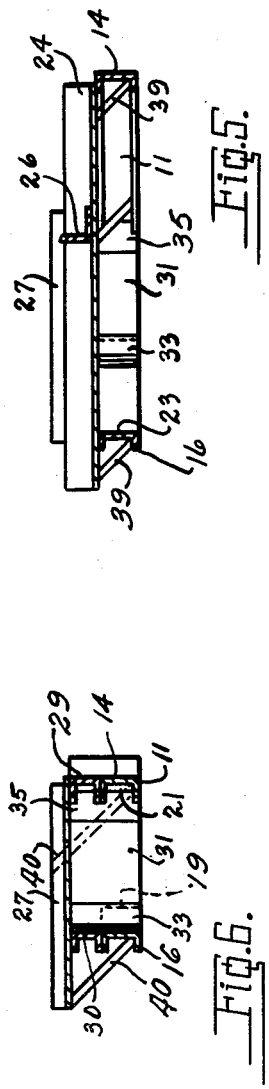
INVENTOR.
WALTER J. ROSSELOT
BY
Joseph A. Rave
Attorney United States Patent Office 2,983,060
Patented May 9, 1961

2,983,060

MATERIAL MOVING DEVICE

Walter J. Rosselot, State Rte. 131, Fayetteville, Ohio

Filed May 8, 1957, Ser. No. 657,887

6 Claims. (Cl. 37—171)

This invention relates to a material moving device, that is, a device for moving and leveling soft earth, sand, gravel and the like.

This device will find its principle use in leveling or smoothing the earth or ground on farms and the like as well as in the leveling and smoothing of building lots, and in the spreading and leveling of sand, gravel and the like in open areas.

The principal object of the present invention is the provision of a material leveling device which is relatively simple of construction yet efficient in use and can be readily attached to a self-propelled vehicle such as the usual farm tractor.

Another object of this invention is the provision of a device for accomplishing the foregoing object which is made of structural steel members, thereby providing considerable weight to the device for accomplishing the desired purpose.

A still further and specific object of the present invention is the provision of a material moving and leveling device that may be utilized by anyone capable of handling a farm tractor and which device is provided with what is commonly known as a "three point hitch" whereby the leveler may be readily attached to and manipulated by said farm tractor.

Other objects and advantages of the present invention will be readily apparent by reference to the following specification considered in conjunction with the accompanying drawings forming a part thereof, and it is to be understood that any modifications may be made in the exact structural details there shown and described, within the scope of the appended claims, without departing from or exceeding the spirit of the invention.

In the drawings:

Fig. 1 is a side elevational view of the material moving device of the present invention.

Fig. 2 is a top plan view of the device as seen in Fig. 1.

Fig. 3 is a front elevational view of the device as seen from the right hand end thereof from line 3—3 on Fig. 1.

Fig. 4 is a transverse sectional view through the device substantially centrally thereof as seen from line 4—4 on Fig. 2.

Fig. 5 is a transverse sectional view of the device taken in a plane to the right of the plane of Fig. 4 as seen from line 5—5 on Fig. 2.

Fig. 6 is a further transverse sectional view of the device taken in a plane further to the right of Fig. 4 as seen from lines 6—6 on Fig. 2.

Fig. 7 is a transverse sectional view through one of the ties or braces as seen from lines 7—7 on Fig. 2 and forming a detail of the construction.

Fig. 8 is a horizontal sectional view through the connection frame of the device of the present invention through which the device is connected with its prime mover, as seen from line 8—8 on Fig. 3.

Throughout the several views of the drawings, similar reference characters are employed to denote the same or similar parts.

As was noted above the device of the present invention is for leveling earth or other relatively loose and readily movable materials and for convenience in description it will hereinafter sometimes be referred to as a leveler. For a more complete understanding of the preferred device, as now contemplated, it has an overall length in the neighborhood of eleven feet and a depth slightly in excess of five feet and upstands, insofar as its connection with a prime mover is concerned, approximately three and one-half feet. Again, the preferred construction, as now contemplated and herein disclosed, has a weight of approximately three-hundred pounds.

Specifically, and as illustrated in the drawings with reference to Fig. 2, particularly, the leveler of the present invention comprises a forward material moving beam 10 formed of right and left hand portions 11 and 12 extending in opposite directions from a center 13 and extending rearwardly from said center 13. The angle of extent of said members 11 and 12 is selected to effect the most efficient material moving. Each of said members 11 and 12 conveniently takes the form of a steel channel having the face 14 forwardly and therefore the channel arms extended rearwardly as seen in Fig. 2.

A second material moving beam 15 is located behind the forward beam 10 and, similar to the forward beam, is formed of portions or members 16 and 17 each extending at an angle to one another from the lengthwise center 18 of the beam. The said portions of members 16 and 17 each extend at an outward, forward angle to have its ends 19 and 20 extend toward the ends 21 and 22 of the forward beam. The said rearward beam 15, similarly to the forward beam 10, conveniently, takes the form of a steel channel and has its face or web 23 forwardly thereof, wherefore its arms extend rearwardly of the leveler.

The beams 10 and 15 are secured in spaced relation to one another by longitudinally extending braces 24 and 25 which are each conveniently in the form of a steel angle member each having its forward end attached to one of the forward beam members 11 and 12 with their forward ends flush with the face 14 of said members. The said longitudinally extending braces or connectors 24 and 25 each has its rear end projecting rearwardly of the beam 15. It should be understood that the connection of the braces or connectors 24 and 25 with the beams 10 and 15 may take any suitable or desirable form, preferably welding.

The braces or connectors 24 and 25 are in turn secured to one another by a transversely extending brace or member 26 again conveniently in the form of a steel angle member which has one leg at each end thereof secured, preferably by welding, to a leg of each of the longitudinally extending braces or members 24 and 25.

The outer ends 21 and 22 of the forward beam 10, particularly its members 11 and 12, are connected to the rear beam inwardly of its ends by longitudinally extending braces or members 27 and 28 which conveniently take the form of steel channels. For a purpose presently to be made clear the connection of said end braces or members 27 and 28 is by means of upwardly projecting spacing blocks 29 and 30 between each of said braces or members 27 and 28 and its forward and rearward beam thereby in effect upwardly spacing the said braces or members 27 and 28 from the beams 10 and 15. For convenience the said spacing blocks 29 and 30 are in the form of sections of a steel channel.

It should be noted that the beams 10 and 15 when considered in a longitudinal direction are of dissimilar lengths with the rearward beam 15 being longer and projecting laterally beyond the ends 21 and 22 of the forward beam. By this construction any material ahead of the forward beam 10 in excess of that needed in effecting a leveling thereof will pass laterally beyond the forward beam ends 21 and 22 and will be caught by the projecting ends 19 and 20 of the rearward beam for action thereon by the said rearward beam. By having the forward and rearward beams extending in opposite directions, the material ahead of the leveler is directed outwardly of the longitudinal center of the space being leveled while the excess material ahead of the forward beam and picked up by the rearward beam is actuated toward the said longitudinal center for thereby distributing the material toward and from the center of the space being leveled with the longitudinal center of said strip as the key line of the surface.

To insure the picking up by the rearward beam of the excess material pushed beyond the ends 21 and 22 of the forward beam a deflector or catcher is provided at each end of the said rearward beam 15. The said catchers, respectively, comprise vertically extended plates 31 and 32 each having its lower edge in the plane of the bottom of the forward and rearward leveling beams, particularly the rearward beam 15. The said plates extend upwardly of the said bottom of the beam 15 to a height equal to the height of the end longitudinal brace connecting blocks 29 and 30, and each of said plates 31 and 32 has its inner portion, respectively, 33 and 34 in contact with the portions 19 and 20 of the rearward leveling beam 15 that project outwardly of the end longitudinal braces 27 and 28. Said deflector portions 33 and 34 of the catcher plates 31 and 32 are secured to the rear beam members 16 and 17 by welding as well as having the vertical edge of said portions welded to the face of spacer blocks 30. The forward ends or portions 35 and 36 of the catcher plates are respectively secured against displacement by a brace 37 and 38 which, respectively, have their outer ends secured to the upper edges of the catcher plate portions 35 and 36 and which braces 37 and 38 each has its inner end secured to the adjacent edge of an end longitudinally extending brace 27 or 28, it being understood that this securement conveniently, though not necessarily, takes the form of welding.

Each of the intermediate longitudinally extending braces or connector 24 and 25 is further secured to its beams by means of an angular brace 39, shown in elevation in Fig. 5, while the outer longitudinally extending braces or spacers 27 and 28 have likewise, their outer ends secured to the beams by means of braces 40, again shown in elevation in Fig. 6.

As was intimated above the leveler of the present invention is adapted to be connected to a prime mover, such as the farm tractor indicated diagrammatically at 41 in Fig. 1. The said tractor is provided with rearwardly projecting lugs one, the upper one, substantially centrally of the tractor and indicated, by the reference numeral 42, and is further provided with lugs rearwardly projecting from the tractor, one on each side of the longitudinal center of the tractor and which lugs are indicated in Fig. 1 by the reference numerals 43 and 44. Each of said lugs 42, 43 and 44 is provided with a transverse aperture for receiving a connecting pin, as will presently be made clear.

In order to connect the leveler of the present invention with the said prime mover or tractor 41 it has, inwardly of its forward beam center or point 13, a connecting frame comprising a transverse brace 45 in the form of a steel channels which has its ends disposed within the channels of the members 11 and 12 of the forward beam 10. Secured to and upstanding from the transverse brace 45 is a pair of posts 46 and 47 each secured as by welding to the said brace 45. The posts 46 and 47 extend to a height slightly above the tractor lugs 43 and 44 so as to support a transverse shaft or rod 48 which has its center in a horizontal plane including the apertures of the tractor lugs 43 and 44. The shaft or rod 48 extends outwardly of the posts 46 and 47 to be received in apertures in links 49 and 50 that extend forwardly to the tractor lugs 43 and 44 with said links having formed in their outer ends apertures to be aligned with said lug apertures and receive a connecting pin, such as pin 51 illustrated in Fig. 1.

The upstanding posts 46 and 47 have respectively secured thereto to project thereabove, arms 52 and 53. Said arms 52 and 53 have their lower ends conveniently disposed in the channels of the posts 46 and 47 and said arms upwardly of said posts 46 and 47 converge to a point short of their upper ends whereupon the arms are bent to be parallel to one another as at 54 and 55. Said arm portions 54 and 55, at their lower ends, are spaced from one another by the upper forward end 56 of a brace presently to be identified. The said arm portions 54 and 55 are provided with aligned apertures for a pin 57 to which is connected one end of an adjustable link 58. The link 58 conveniently takes the form of a turn-buckle whereby it may be lengthened or shortened so as to align its other apertured end with the aperture of the upper tractor lug 42 for connection therewith through pin 59.

It will be noted that the leveler is readily connectable with a tractor having the "three point hitch" and substantially all tractors have this hitch whose dimensions are substantially identical or standard.

The upper end of the leveler connecting frame is braced by the brace 60 whose upper end 56 is disposed between the arm portions 54 and 55. The other end of the brace 60 is outwardly flattened as at 61 for permanent securement to the rearward beam 15. The brace 60 is formed of two members, the member just described and a second member 62 which is mounted at right angles to and substantially centrally of the member 60 to give the said brace a T-shaped cross section as illustrated in Fig. 7. The attaching frame is further braced by rearwardly projecting braces 63 and 64 which conveniently take the form of steel straps having their forward ends secured to the posts 46 and 47, just below the shaft 48, and having their other ends secured to the transverse brace or steel angle 26, as clearly illustrated in Fig. 4.

As was noted the leveler of the present invention has inherent weight for performing a normal job and is rigidly constructed to withstand the forces and pressures acting thereagainst in effecting material moving and leveling. By reference to Figs. 1 and 4 it will be noted that there is provided a space above the leveling beams, indicated by the reference numeral 65, whose bottom may be considered as formed by the longitudinal braces 24 and 25 and which space may be taken advantage of for mounting logs or other members for adding additional weight to the leveler and thereby increasing its ability to move material all within the power of the prime mover or tractor 41.

What is claimed is:
1. In a leveler of the class described, the combination of a forward and a rearward leveling beam each formed of a continuous channel iron from end to end with its face forwardly and its upper and lower flanges rearwardly projecting and each beam having its lengthwise center in alignment with the other and in alignment with the longitudinal center of the leveler, said forward and rearward beams each having its lower flange in the plane of and constituting the leveling surface for the full length of each beam and each beam having the portions thereof on the same side of the aligned centers converging, means connecting said beams in spaced relation and with the ends of their portions on the same side of said aligned centers spaced from one another to permit material passage to the rearward beam, a transverse brace between the converging portions of the forward leveling beam, an upstanding upright from each of the opposite ends of said forward beam transverse brace with each upright having an attaching point at its upper end, a strap from said upper end of each upright extending toward the other with their inner ends joined and providing an attaching point in line with the aligned beams centers whereby said attaching points are substantially midway, transversely, of the leveler and laterally spaced from and on each side of said substantially midway attaching point, and means connecting said uprights and connecting straps attaching points to a prime mover.

2. In a leveler of the class described, the combination of a forward and a rearward leveling beam each formed of a continuous channel iron from end to end with its face forwardly and its upper and lower flanges rearwardly projecting and each beam having its lengthwise center in alignment with the other and in alignment with the longitudinal center of the leveler, said forward and rearward beams each having its lower flange in the plane of and constituting the leveling surface for the full length of each beam and each beam having the portions thereof on the same side of the aligned centers converging, means connecting said beams in spaced relation and with the ends of their portions on the same side of said aligned centers spaced from one another to permit material passage to the rearward beam, a transverse brace between the converging portions of the forward leveling beam, an upstanding upright from each of the opposite ends from said forward beam transverse brace with each upright having an attaching point are at its upper end, a strap from said upper end of each upright extending toward the other with their inner ends joined and providing an attaching point in line with the aligned beams centers whereby said attaching point substantially midway, transversely, of the leveler and laterally spaced from and on each side of said substantially midway attaching point, means carried by said rearward beam projecting laterally of the ends of the forward beam for directing material to said rearward beam, and means connecting said uprights and connecting straps attaching points to a prime mover.

3. In a leveler of the class described, the combination of a forward and a rearward leveling beam each formed of a continuous channel iron from end to end with its face forwardly and its upper and lower flanges rearwardly projecting and each beam having its lengthwise center in alignment with the other and in alignment with the longitudinal center of the leveler, said forward and rearward beams each having its lower flange in the plane of and constituting the leveling surface for the full length of each beam and each beam having the portions thereof on the same side of the aligned centers converging, means connecting said beams in spaced relation and with the ends of their portions on the same side of said aligned centers spaced from one another to permit material passage to the rearward beam, said forward and rearward beams having height, a deflector plate of a height greater than the height of the beams secured to and carried by each end of the rearward beam and each deflector plate including a first portion forwardly, outwardly, angularly extending and a second portion at the end of the first portion forwardly extending and parallel with the longitudinal center of the leveler, a transverse brace between the converging portions of the forward leveling beam, an upstanding upright from each of the opposite ends of said forward beam transverse brace with each upright having an attaching point at its upper end, a strap from said upper end of each upright extending toward the other with their inner ends joined and providing an attaching point in line with the aligned beams centers whereby said attaching points are substantially midway, transversely, of the leveler and laterally spaced from and on each side of said substantially midway attaching point, and means connecting said uprights and connecting straps attaching points to a prime mover.

4. In a leveler of the class described, the combination of a forward and a rearward leveling beam each formed of a continuous channel iron from end to end with its face forwardly and its upper and lower flanges rearwardly projecting and each beam having its lengthwise center in alignment with the other, said forward and rearward beams each having its lower flange in the plane of and constituting the leveling surface and each beam having the portions thereof on the same side of their aligned centers converging, means joining the said beams in spaced relation and with said means located respectively on each side of said aligned beam centers, a transverse brace between the converging portions of the forward leveling beam, an upstanding upright from each of the opposite ends of said forward beam transverse brace with each upright having an attaching point at its upper end, a strap from said upper end of each upright upwardly extending toward the other with their inner ends joined and providing an attaching point in line with the aligned beam centers whereby said attaching points are substantially midway, transversely, of the leveler and laterally spaced and on each side of said substantially midway attaching point, a brace from said midway attaching point extending rearwardly and downwardly to the rearward beam and secured thereto, said rearwardly and downwardly extending brace defining between itself and the beams joining means a space above the said forward and rearward leveling beams, and means connecting said uprights and connecting straps attaching points to a prime mover.

5. In a leveler of the class described, the combination of a forward and a rearward leveling beam each formed of a continuous channel iron from end to end with its face forwardly and its upper and lower flanges rearwardly projecting and each beam having its lengthwise center in alignment with the other, said forward and rearward beams each having its lower flange in the plane of and constituting the leveling surface and each beam having the portions thereof on the same side of their aligned centers converging, a spacing and connecting member in the form of an angle iron located one on each side of said leveling beams aligned centers spacing said beams from one another, a transverse brace joining said beams spacing and connecting members, said leveling beams spacing and connecting members being located on the upper flanges of said beams and providing a passageway therebeneath, said rearward leveling beam having greater length than the forward leveling beam so that the ends of said rearward leveling beam project laterally of said forward leveling beam and said forward leveling beam being of less length than the rearward leveling beam and having its ends short of said rearward leveling beam to provide a passageway for material, a transverse brace between the converging portions of the forward leveling beam, an upstanding upright from each of the opposite ends of said forward beam transverse brace with each upright having an attaching point at its upper end, a strap from said upper end of each upright upwardly extending toward the other with their inner ends joined and providing an attaching point in line with the aligned beams centers whereby said attaching points are substantially midway, transversely, of the leveler and laterally spaced from and on each side of said substantially midway attaching point, a brace rearwardly and downwardly extending from said midway attaching point to the rearward beam and secured thereto, a brace from each of said uprights upper end attaching points rearwardly and downwardly extending to the leveling beams spacing and connecting members transverse brace, said uprights rearwardly and downwardly extending braces defining between them and said leveling beams spacing members and uprights a usable space, and means connecting said uprights and connecting straps attaching points to a prime mover.

6. In a leveler of the class described, the combination of a forward and a rearward leveling beam each formed of a continuous channel iron from end to end with its face forwardly and its upper and lower flanges rearwardly projecting and each beam having its lengthwise center in alignment with the other, said forward and rearward beams each having its lower flange in the plane of and constituting the leveling surface and each beam having the portions thereof on the same side of their aligned centers converging, a spacing and connecting member in the form of an angle iron located one on each side of said leveling beams aligned centers spacing said beams from one another, a transverse brace joining said beams spacing and connecting members, said leveling beams spacing and connecting members being located on the upper flanges of said beams and providing a passageway therebeneath, said rearward leveling beam having greater length than the forward leveling beam so that the ends of said rearward leveling beam project laterally of said forward leveling beam and said forward leveling beam being of less length than the rearward leveling beam and having its ends short of said rearward leveling beam to provide a passageway for material, a deflector plate of a height corresponding to the combined height of the rearward leveling beam and the connecting members carried by each end of the rearward leveling beam, each deflector plate including a first portion forwardly, outwardly, angularly extending and a second portion at the end of the first portion forwardly extending and parallel with the leveling beams centers alignment receiving material from the forward leveling beam and directing it to the rearward leveling beam, a transverse brace between the converging portions of the forward leveling beam, an upstanding upright from each of the opposite ends of said forward beam transverse brace with each upright having an attaching point at its upper end, a strap from said upper end of each upright upwardly extending toward the other with their ends joined and providing an attaching point in line with the aligned beams centers whereby said attaching points are substantially midway, transversely, of the leveler and laterally spaced from and on each side of said substantially midway attaching point, a brace rearwardly and downwardly extending from said midway attaching point to the rearward beam and secured thereto, a brace from each of said uprights upper ends attaching points rearwardly and downwardly extending to the leveling beams spacing and connecting members transverse brace, said uprights rearwardly and downwardly extending braces defining between them and said leveling beams spacing members and uprights a usable space, and means connecting said uprights and connecting straps attaching points to a prime mover.

References Cited in the file of this patent

UNITED STATES PATENTS

| | | |
|---|---|---|
| 1,447,306 | Heintz | Mar. 6, 1923 |
| 1,575,814 | Burson | Mar. 9, 1926 |
| 1,624,421 | Meyer | Apr. 12, 1927 |
| 1,743,532 | Crow et al. | Jan. 14, 1930 |
| 1,799,424 | Jersey | Apr. 7, 1931 |
| 1,807,639 | Stocker | June 2, 1931 |
| 1,848,308 | Brackett | Mar. 8, 1932 |
| 2,142,262 | Beckham et al. | Jan. 3, 1939 |
| 2,321,516 | Robertson | June 8, 1943 |
| 2,493,565 | Arps | Jan. 3, 1950 |
| 2,645,989 | Prince | July 21, 1953 |
| 2,683,960 | Love | July 20, 1954 |
| 2,731,896 | Wurster | Jan. 24, 1956 |
| 2,828,556 | Drum et al. | Apr. 1, 1958 |

FOREIGN PATENTS

| | | |
|---|---|---|
| 165,653 | Germany | Nov. 23, 1905 |